United States Patent
Tiirola et al.

(10) Patent No.: US 11,777,687 B2
(45) Date of Patent: *Oct. 3, 2023

(54) B-IFDMA CONFIGURATION FOR UNLICENSED BAND OPERATION

(71) Applicant: Nokia Solutions and Networks Oy, Espoo (FI)

(72) Inventors: Esa Tapani Tiirola, Kempele (FI); Kari Juhani Hooli, Oulu (FI); Timo Erkki Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/705,505

(22) Filed: Mar. 28, 2022

(65) Prior Publication Data

US 2022/0255702 A1    Aug. 11, 2022

Related U.S. Application Data

(63) Continuation of application No. 16/068,155, filed as application No. PCT/EP2017/050185 on Jan. 5, 2017, now Pat. No. 11,316,641.

(Continued)

(51) Int. Cl.
*H04L 5/00* (2006.01)
*H04L 1/00* (2006.01)
(Continued)

(52) U.S. Cl.
CPC .......... *H04L 5/0053* (2013.01); *H04L 1/0071* (2013.01); *H04L 5/001* (2013.01);
(Continued)

(58) Field of Classification Search
CPC ..... H04L 5/0053; H04L 5/001; H04L 5/0041; H04L 1/0071; H04W 72/0413; H04W 72/14
See application file for complete search history.

(56) References Cited

U.S. PATENT DOCUMENTS

2007/0036179 A1*  2/2007  Palanki ............... H04L 25/0232
                                                                        370/208
2014/0023004 A1   1/2014  Kumar et al. ................. 370/329
(Continued)

FOREIGN PATENT DOCUMENTS

CN    104488206 A      4/2015
WO   WO-2015/042396 A1   3/2015

OTHER PUBLICATIONS

"New Work Item on enhanced LAA for LTE Approval", Ericsson, et al., #GPP TSG RAN Meeting #70, RP-152272, Dec. 2015, 8 pgs.

(Continued)

*Primary Examiner* — Lakeram Jangbahadur
(74) *Attorney, Agent, or Firm* — Harrington & Smith

(57) ABSTRACT

Various communication systems may benefit from appropriate handling of uplink communications. For example, certain wireless communication systems may benefit from an uplink coverage extension for unlicensed band operation. A method can include configuring a first interlace having a first starting physical resource block. The method can also include configuring a second interlace having a second starting physical resource block offset from the first physical resource block. The method can further include transmitting or receiving a signal based on a combination of the first interlace and the second interlace. The combination can include at least one cluster but less than two clusters in each measurement interval.

17 Claims, 19 Drawing Sheets

Related U.S. Application Data

(60) Provisional application No. 62/275,537, filed on Jan. 6, 2016.

(51) Int. Cl.
*H04W 72/21* (2023.01)
*H04W 72/23* (2023.01)

(52) U.S. Cl.
CPC ........... *H04L 5/0041* (2013.01); *H04W 72/21* (2023.01); *H04W 72/23* (2023.01)

(56) References Cited

U.S. PATENT DOCUMENTS

| | | | | |
|---|---|---|---|---|
| 2015/0156638 A1* | 6/2015 | Yerramalli | ............ | H04L 5/0051 455/454 |
| 2015/0181589 A1 | 6/2015 | Luo | ............... | 370/329 |
| 2015/0358826 A1* | 12/2015 | Wei | ....................... | H04W 16/14 370/329 |
| 2016/0037352 A1 | 2/2016 | Wei | ................................ | 455/454 |
| 2016/0353343 A1* | 12/2016 | Rahman | ................ | H04W 36/32 |
| 2018/0227838 A1* | 8/2018 | Hayashi | .............. | H04W 72/042 |

OTHER PUBLICATIONS

"Interlacing in uplink physical layer design", Ericsson, MuLTEfire WG Radio Meeting #2, TSWG-2.19, Dec. 2015, 5 pgs.
3GPP TSG RAN WG1 Meeting #81, Fukuoka, Japan, May 25-29, 2015, R1-152872, "discussion on UL transmission for LAA", Samsun, 5 pgs.
ETSI EN 301 893 V1.7.1 (Jun. 2012), "Broadband Radio Access Networks (BRAN); 5 GHz high performance RLAN, Harmonized EN coverin; the essential reuirements of article 3.2 of the R&TTE Directive", 90 pages.

* cited by examiner

FIG 2

| FIG 2A | FIG 2B | FIG 2C |

FIG 2A

One B-IFDMA interlace, 6 interlaces, 16 or 17 PRBs per interlace (17 interlaces show in the figure below)

| PRB | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 |

- Unoccupied
- Partially occupied
- Occupied by full PRB

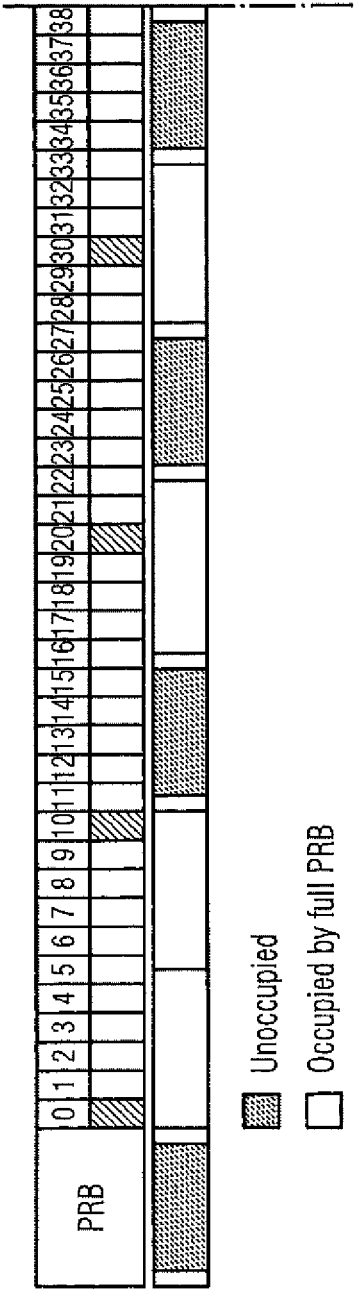

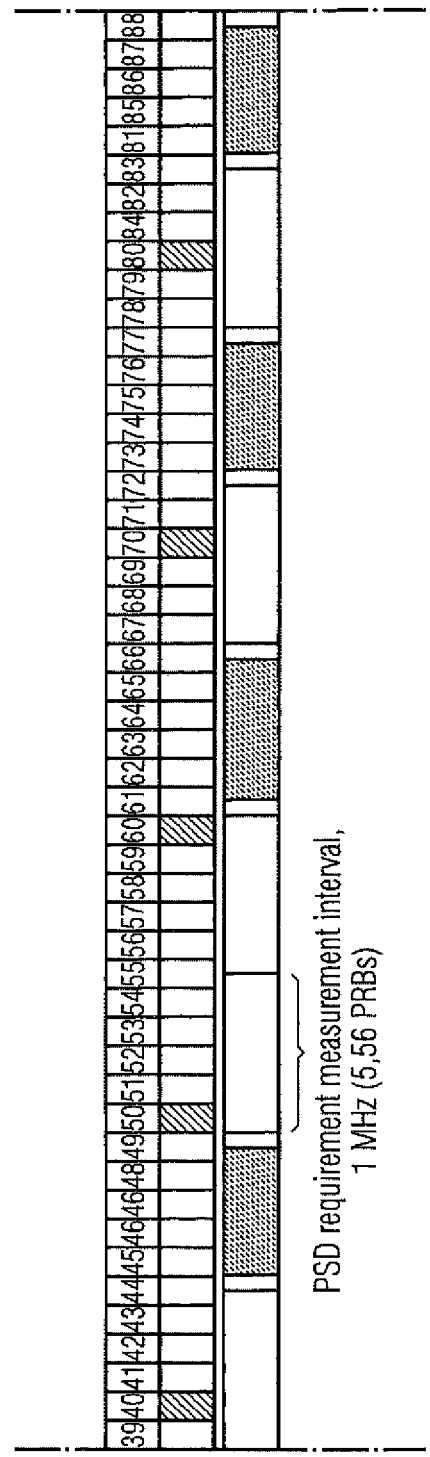

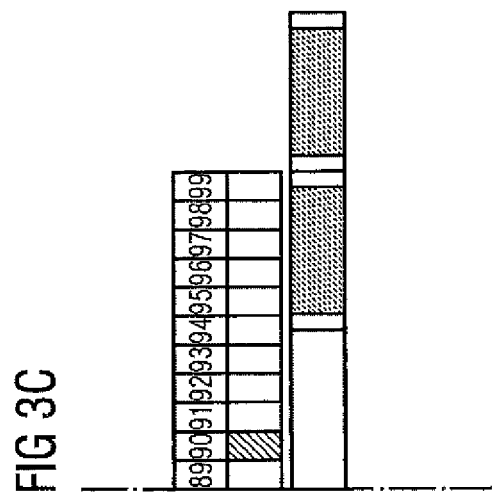

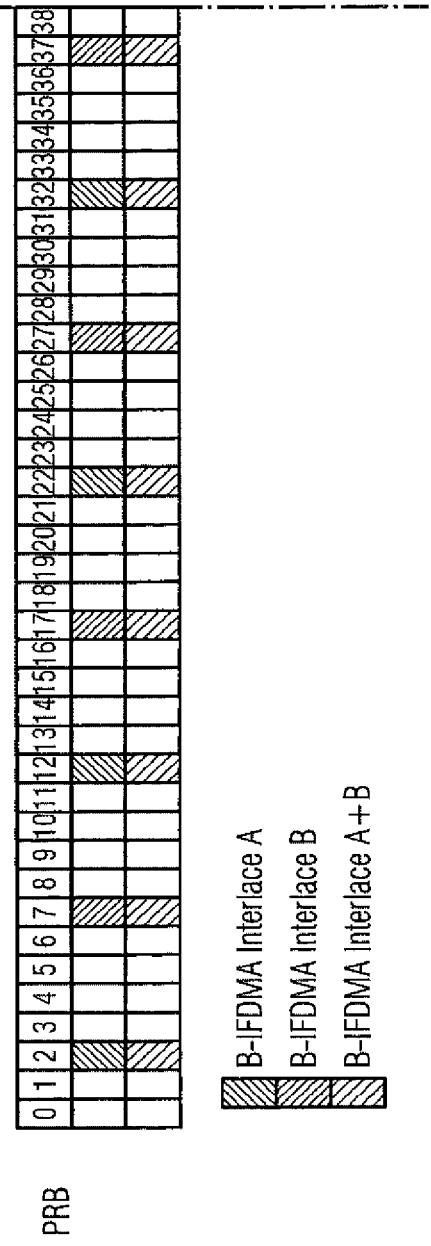

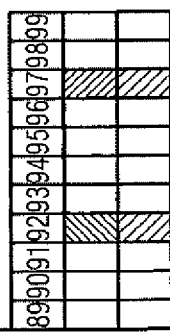

$P_{loss, AB}$ and $P_{max, AB}$ as a function of x (cluster size)

| X | $P_{loss, AB}$ (dB) | $P_{max, AB}$ (dBm) ChBW = 20 MHz | $P_{max, AB}$ (dBm) ChBW = 10 MHz |
|---|---|---|---|
| 1 | 1.46 | 22.09 | 19.08 |
| 2 | 0.61 | 22.94 | 19.93 |
| 3 | 0.28 | 23.27 | 20.26 |
| 4 | 0.11 | 23.44 | 20.43 |
| 5 (Full BW) | 0.00 | 23.55 | 20.54 |

| FIG 7A | FIG 7B | FIG 7C |

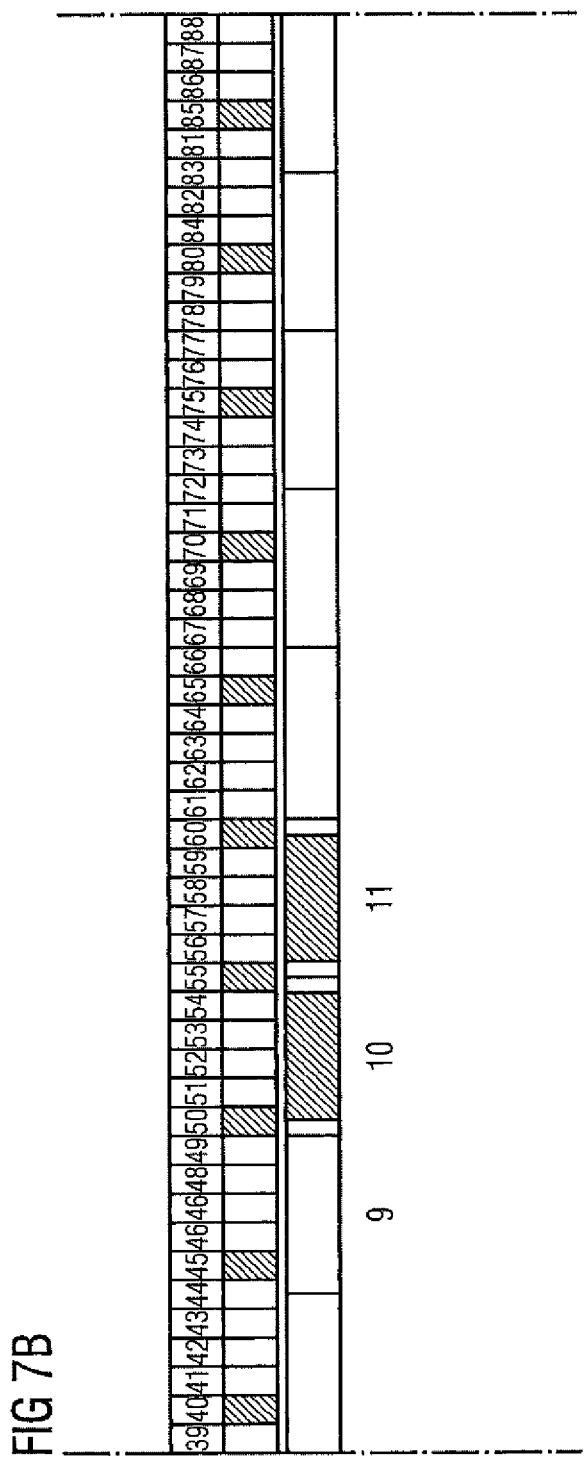

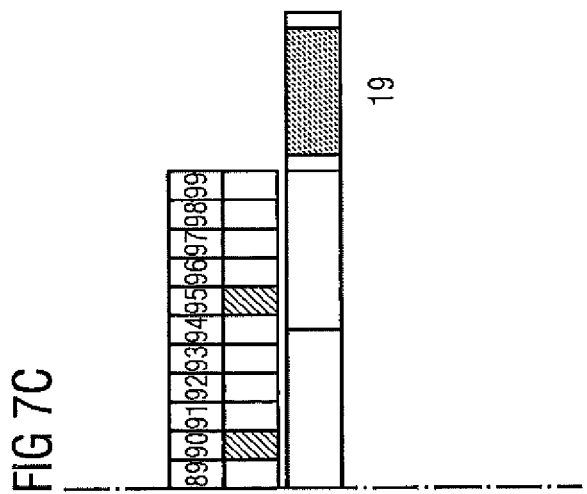

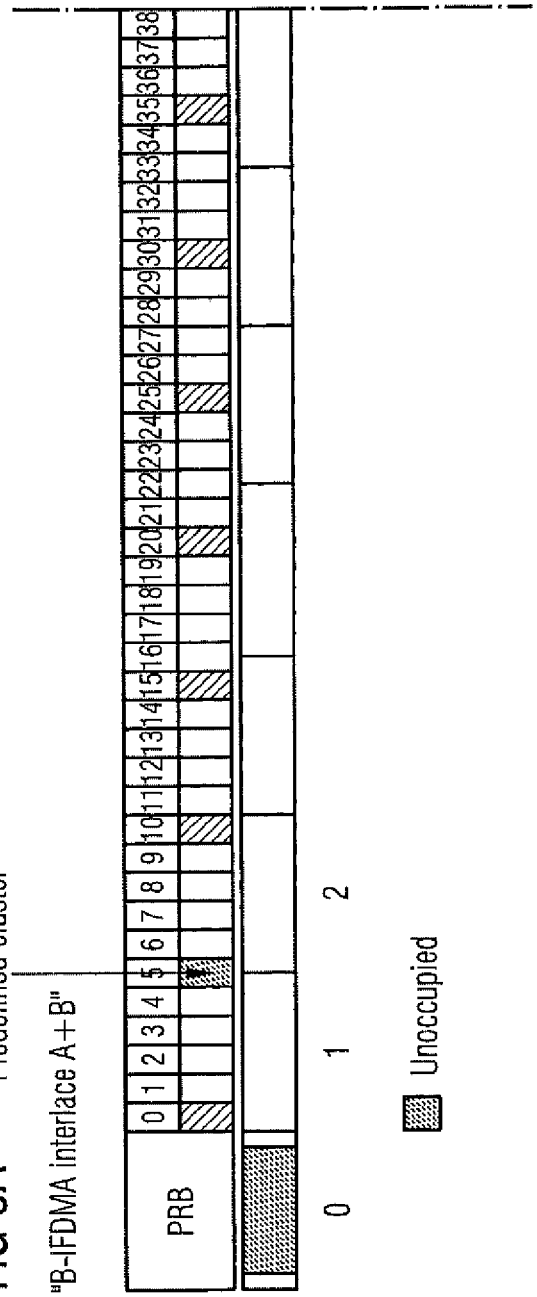

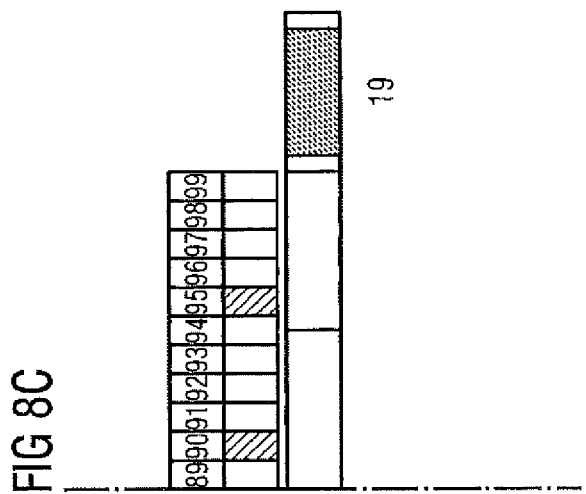

FIG 10
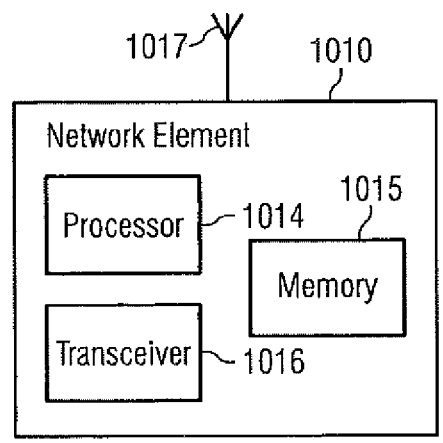
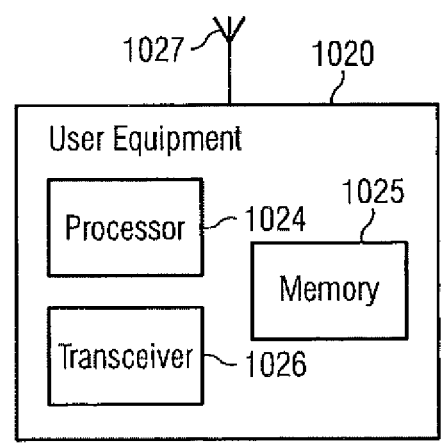

B-IFDMA CONFIGURATION FOR UNLICENSED BAND OPERATION

This patent application is a continuation of U.S. patent application Ser. No. 16/068,155, filed on Jul. 5, 2018, which is a U.S. National Stage application of International Patent Application Number PCT/EP2017/050185 filed Jan. 5, 2017, and claimed priority to U.S. application 62/275,537 filed Jan. 6, 2016, which are hereby incorporated by reference in their entireties.

BACKGROUND

Field

Various communication systems may benefit from appropriate handling of uplink communications. For example, certain wireless communication systems may benefit from an uplink coverage extension for unlicensed band operation.

Description of the Related Art

Release 13 (Rel-13) of long term evolution (LTE) licensed assisted access (LAA) may provide licensed-assisted access to unlicensed spectrum while coexisting with other technologies and fulfilling regulatory requirements. In Rel-13 LAA, unlicensed spectrum may be utilized to improve LTE downlink (DL) throughput.

In Rel-13, one or more LAA DL secondary cells (SCells) may be configured to a user equipment (UE) as part of DL carrier aggregation (CA) configuration, while a primary cell (PCell) may need to be on licensed spectrum. LTE LAA may evolve to support LAA UL transmissions on unlicensed spectrum in LTE Rel-14.

Standardized L LAA approach in Rel-13 based on CA framework assumes transmission of uplink control information (UCI) on PCell in a licensed band. However, LAA may be extended with uplink support including physical uplink control channel (PUCCH), as well as in dual connectivity operation. Thus, certain approaches may allow for non-ideal backhaul between PCell in licensed spectrum and SCell(s) in unlicensed spectrum. A 3GPP Rel-14 Work Item introduces LAA UL support (Enhanced LAA for LTE, RP-152272, the entirety of which is hereby incorporated herein by reference.

Furthermore, there may be standalone LTE operation on unlicensed spectrum. L TE standalone operation on unlicensed spectrum means that evolved Node B (eNB)/UE air interface may rely solely on unlicensed spectrum without any carrier on licensed spectrum. MulteFire (MLF) may be an example of a system that incorporates standalone LIE operation on unlicensed spectrum.

In LTE operation on unlicensed carriers, depending on the regulatory rules, the UE may need to perform listen before talk (LBT) prior to any UL transmission. Some exceptions may exist though. For example, at least in some regions, transmission of acknowledgment/negative acknowledgement (ACK/NACK) feedback may be possible without LBT when immediately following a DL transmission, similar to WiFi operation. Short control signaling (SCS) rules defined for Europe by ETSI may allow for transmission of control signaling with a duty cycle of no more than 5% over 50 ms period without performing LBT:

Definition: Short Control Signalling Transmissions are transmissions used by Adaptive equipment to send management and control frames (e.g. ACK/NACK signals) without sensing the channel for the presence of other signals. NOPE: It is not required for adaptive equipment to implement Short Control Signalling Transmissions. If implemented, short control signaling transmissions of adaptive equipment may need to have a maximum duty cycle of 5% within an observation period of 50 ms.

Additionally, at least in some regions, scheduled UL transmissions may in general be allowed without LBT, when the transmission follows directly a DL transmission before which the eNB has performed LBT and total transmission time covering both DL and UL is limited by the maximum Tx burst time defined by the regulator.

Block interleaved orthogonal frequency division multiple access (B-IFDMA) is a baseline uplink transmission scheme that can be used for uplink transmission in unlicensed spectrum. Wideband transmission may be required by the regulatory rules, such as ETSI, for example all signal(s) may need to be easily detectable by neighboring nodes.

FIG. 1 shows the principle of physical uplink shared channel (PUSCH) transmission according to B-IFDMA on interlaces having 10 equally spaced clusters. The approach shown in FIG. 1 may ensure good coexistence with LTE, in terms of physical resource block (PRB) granularity. The approach in FIG. 1 may also provide good multiplexing capacity: up-to 10 parallel interlaces. This approach may also provide good resource scalability by means of variable cluster size, in terms of a cluster size of variable x PRBs. The approach may also provide fixed size resource for all interlaces with given cluster size. Other benefits of such an approach may include good support for PUCCH/PUSCH multiplexing and compatibility with ETSI bandwidth occupancy rules.

Unlicensed band usage can involve different regulatory rules which aim at fair and equal spectrum usage for different devices. Those rules may involve limitations related to occupied channel bandwidth. For example, in ETSI Standard (ETSI EN 301 893, v.1.7.1): "The Nominal Channel Bandwidth shall be at least 5 MHz at all times. The Occupied Channel Bandwidth shall be between 80% and 100% of the declared Nominal Channel Bandwidth. In case of smart antenna systems (devices with multiple transmit chains) each of the transmit chains shall meet this requirement."

The rules on unlicensed band usage may also include limitations related to maximum power spectral density (PSD). Maximum PSD requirements exist in many different regions (see e.g. 3GPP IX 36.889). For example, the requirement may be stated with a resolution bandwidth of 1 MHz. The ETSI 301 893 specification, for example, requires 10 dBm/MHz for 5150-5350 MHz. Similar limitations are involved also in other places. For example, peak UE's PSD for 5.15-5.725 MHz is 11 dBm/MHz in USA.

FIG. 2, which extends over FIGS. 2A, 2B, and 2C, illustrates B-IFDMA with 6 interlaces. In this example, cluster size=1 PRB, 20 MHz. This design, illustrated in FIG. 2, is based on 6 interlaces, each having 16 or 17 clusters.

The maximum Tx power for this approach can be calculated as shown in Table 1:

TABLE 1

| a | Max PSD | 11 | dBm/MHz |
|---|---|---|---|
| b | Max Tx power with 18 clusters/18 MHz | 23.55 | dB |
| c | Max power with 16 clusters/18 MHz | 23.04 | dB |
| d | Max power loss | 0.51 | dB | b = a + 10*log10(18)
c = a + 10*log10(16)
d = b − c

As shown in Table 1, maximum power loss with 6 interlaces may be only 0.51 dB. On the other hand, the design with 6 interlaces may only permit six users to be multiplexed in frequency domain. However, multiplexing may involve both control and data channels. Moreover, in a TDD system, a certain UL subframe may need to convey UL control channel for multiple UEs and multiples subframes. There may also be a need to support various services including voice over Internet protocol (VoIP). All these highlight the importance of having high multiplexing capability.

Additionally, resource size in terms of number of PRBs can vary from interlace-to-interlace. Usage of multiple resource sizes may complicate the system design, especially control plane. For example, in the example illustrated in FIG. 2 there may be four interlaces with 17 PRBs and two interlaces with 16 PRBs.

It may also not be possible to consider fixed size resources on top of six interlaces. According to this principle, resource size may be 16 PRBs per interlace. This means that there may be four unused PRBS, corresponding to 4% additional overhead in 100 MHz bandwidth.

BRIEF DESCRIPTION OF THE DRAWINGS

For proper understanding of the invention, reference should be made to the accompanying drawings, wherein:

FIG. 2, which extends over FIGS. 2A, 2B, and 2C, illustrates B-IFDMA with 6 interlaces.

FIG. 3, which extends over FIGS. 3A, 3B, and 3C, illustrates a B-IFDMA design based on 10 interlaces, according to certain embodiments.

FIG. 4, which extends over FIGS. 4A, 4B, and 4C, illustrates a combination of two B-IFDMA interlaces, according to certain embodiments.

FIGS. 7A, 7B, and 7C, illustrates an example of measurement of B-IFDMA interlace A+B, according to certain embodiments.

FIG. 8, which extends over FIGS. 8A, 8B, and 8C, illustrates predefined clusters, according to certain embodiments.

FIG. 10 illustrates a system according to certain embodiments.

DETAILED DESCRIPTION

Certain embodiments relate to uplink (UL) transmission on unlicensed spectrum subject to listen-before-talk rules. Certain embodiments provide a solution for UL coverage extension when operating according to regulatory rules related to limited power spectral density, such as dBm/MHz. Certain embodiments may also be applicable to 3GPP LIE licensed assisted access enhancements, such as support for uplink operation, as well as possible standalone operation on unlicensed carriers.

Certain embodiments may specifically address maximum PSD limitations, which may be imposed by regulators. Without proper design, a signal with small transmission bandwidth, such as an UL control signal, may be limited by peak PSD. This may lead to reduced transmission power and reduced coverage. In standalone operation, such as MLF, cell coverage may be limited by UL control channels, such as random access (RA) preamble, physical uplink control channel (PUCCH) hybrid automatic repeat request acknowledgment (HARQ-ACK), and scheduling request (SR), especially when using short PUCCH.

More particularly, certain embodiments may provide an UL coverage extension solution when operating according to PSD-limitation in unlicensed spectrum and when multiples of 10 interlaces/clusters are applied in the transmission. Thus, certain embodiments may use a B-IFDMA design based on 10 interlaces. FIG. 3, which extends over FIGS. 3A, 3B, and 3C, illustrates a B-IFDMA design based on 10 interlaces, according to certain embodiments.

Figure 1:
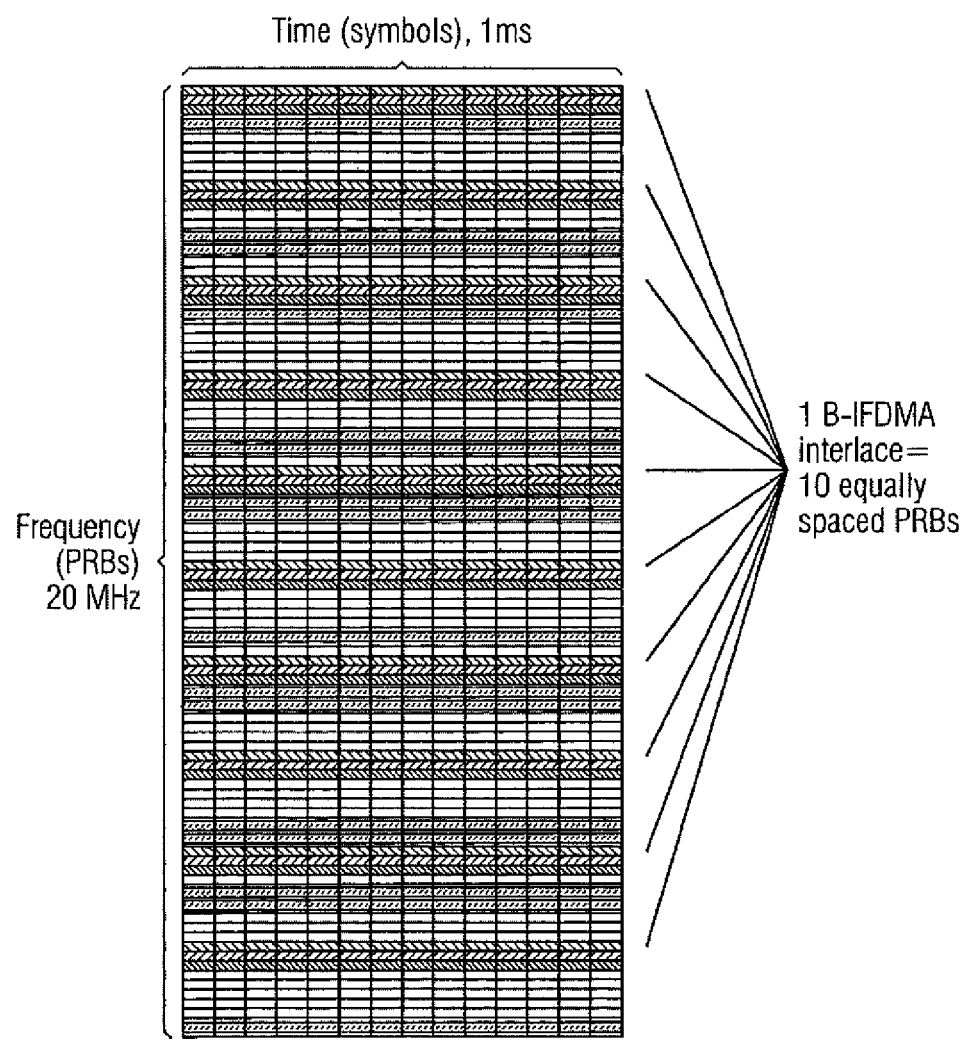
FIG. 1 shows the principle of PUSCH transmission according to B-IFDMA on interlaces having 10 equally spaced clusters.
Figure 2B:
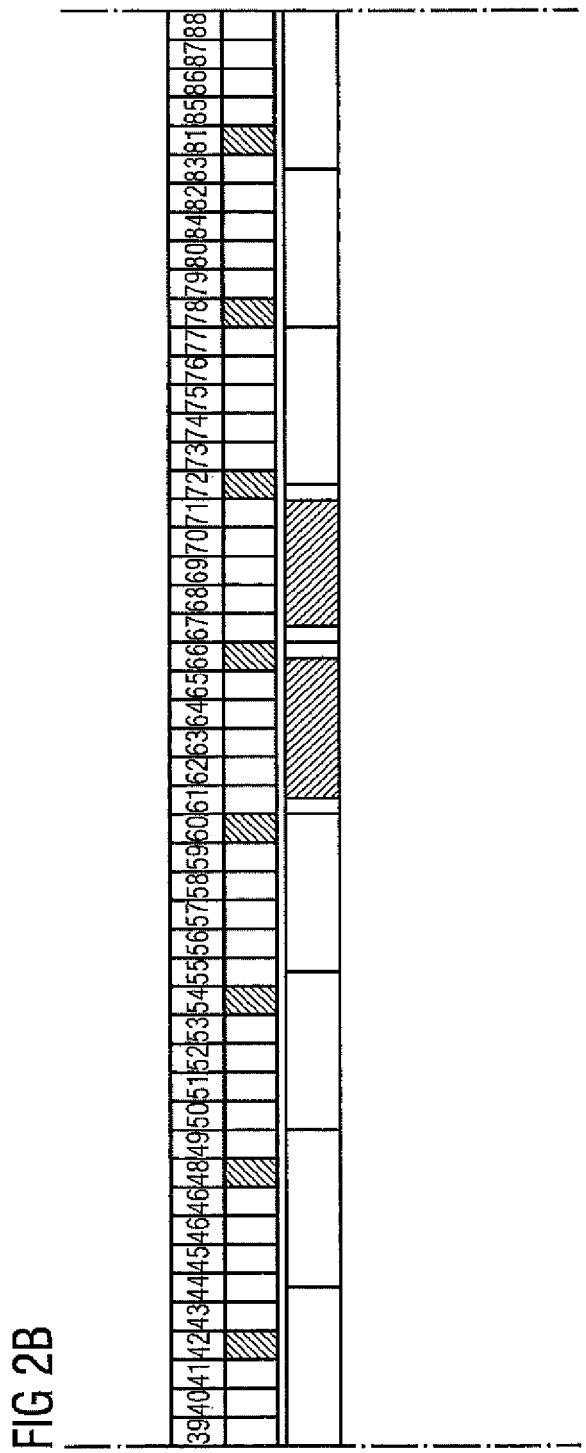
Figure 2C:
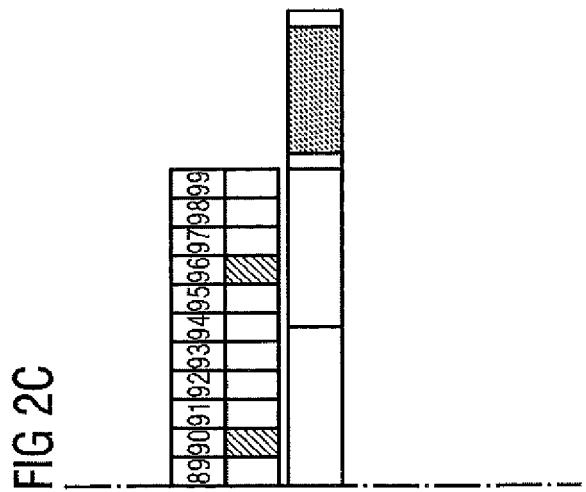

As shown in FIG. 3, the 1st interlace is considered, shown using shading at blocks 0, 10, 20, 30, and so on. Resolution bandwidth used in PSD measurement can be 1 MHz. Thus, FIG. 2 illustrates B-IFDMA with 10 interlaces, cluster size=1 PRB, 20 MHz nominal system bandwidth, 18 MHz occupied bandwidth, 100 PRBs, 180 KHz each.

The maximum transmission (Tx) power with 20 MHz nominal system bandwidth, 18 MHz occupied Bandwidth (100 PRBs, 180 KHz each) can be calculated as shown in Table 2:

TABLE 2

| a | Max PSD | 11 | dBm/MHz |
|---|---|---|---|
| b | Max Tx power with 18 clusters/ 18 MHz | 23.55 | dB |
| c | Max power with 10 clusters/ 18 MHz | 21.00 | dB |
| d | Max power loss | 2.55 | dB | b = a + 10*log10(18)
c = a + 10*log10(10)
d = b − c

The example in Table 2 shows that a design with ten clusters may experience 2.6 dB power loss compared to maximum achievable Tx power with LIE numerology, including spectrum usage efficiency of 0.9. This loss may be due to the fact that some of the 1-MHz Measurement intervals will not be used for transmission because the cluster spacing is larger than 1 MHz. In other words, optimal transmit power, in terms of PSD on a per-PRB level, may be reached when the number of clusters is equal to 18, assuming 18 MHz bandwidth, e.g. 100 PRBs, 180 KHz each.

Alternatively, if the number of clusters is larger than 18, some of the 1-MHz measurement intervals may contain more 180 KHz or 1 PRB of PUSCH, and maximum PSD may be defined according to those measurement intervals. This approach may also lead to a loss in maximum transmit power as the PSD per PRB may need to be reduced for all clusters.

Certain embodiments provide a specific configuration for UL coverage extension when operating according to PSD-limitation in unlicensed spectrum. In the certain embodiments, UL transmission includes two B-IFDMA interlaces both occupying every tenth PRB. A first interlace, interlace A, can start at PRB a. A second interlace, interlace B, can start at offset b=a+5.

In certain embodiments, a∈[0, 1, 2, 3, 4]. Two B-IFDMA interlaces tied together can be considered as a single resource, namely "B-IFDMA interlace A+B."

Cluster size of Interlace A and Interlace B can be the same. The size can be expressed as parameter x, where x∈[1, 2, 3, 4].

Figure 4B:
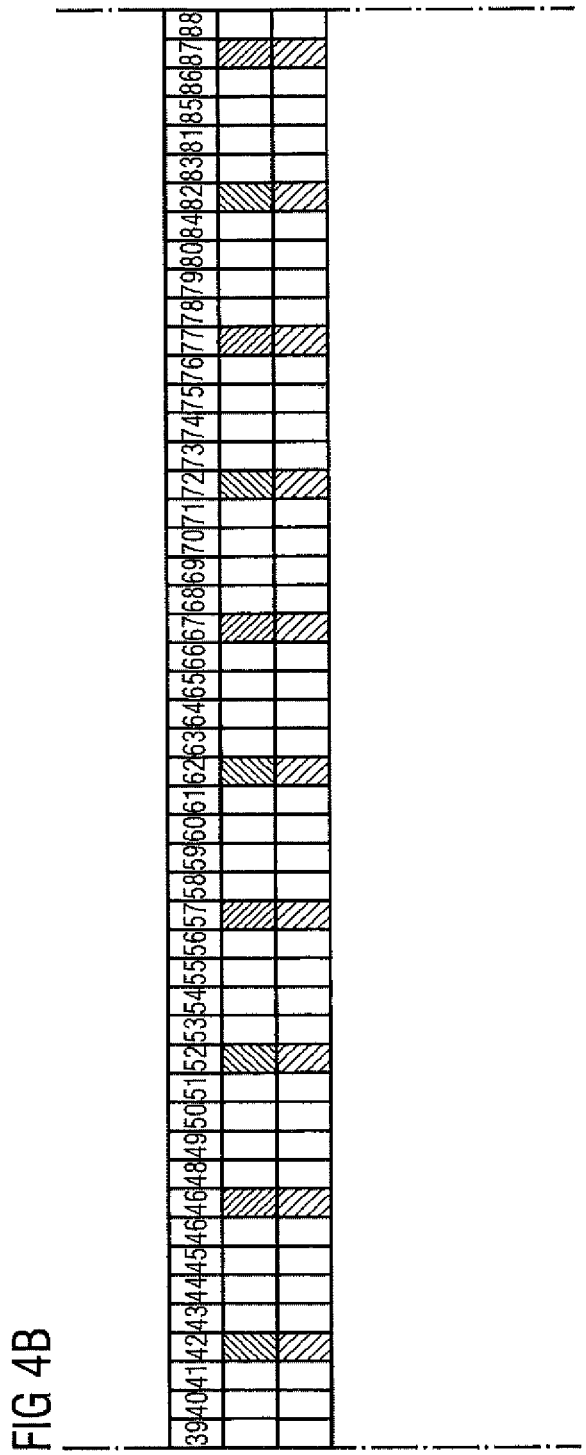

FIG. 4, which extends over FIGS. 4A, 4B, and 4C, illustrates a combination of two B-IFDMA interlaces, according to certain embodiments. In this example, cluster size=1 PRB, 20 MHz. As can be seen from the different shadings, the combined B-IFDMA interlace A+B can include both interlace A at blocks 2, 12, and so on, as well as interlace B at blocks 7, 17, and so on.

The signal structure B-IFDMA interlace A+B can have the property that the signal has at least one cluster but less than two clusters within each measurement interval, such as 1 MHz. The measurement intervals can be within the used channel bandwidth, for example 0.9*nominal bandwidth. In other words, the spacing between clusters can be less than or equal to the measurement interval, and cluster spacing plus cluster size can be larger than the measurement interval. Further, clusters can be evenly spaced.

The feature of having at least one cluster but less than two clusters can refer to a situation in which the portion of the signal that is within a measurement interval can have bandwidth of at least one cluster but less than two full clusters. The signal portion may belong to one or two physical clusters of one B-IFDMA interlace A+B signal.

These properties may allow definition of reasonable power control (PC) rules to meet the PSD limit given by a regulator.

Figures 5, 6:
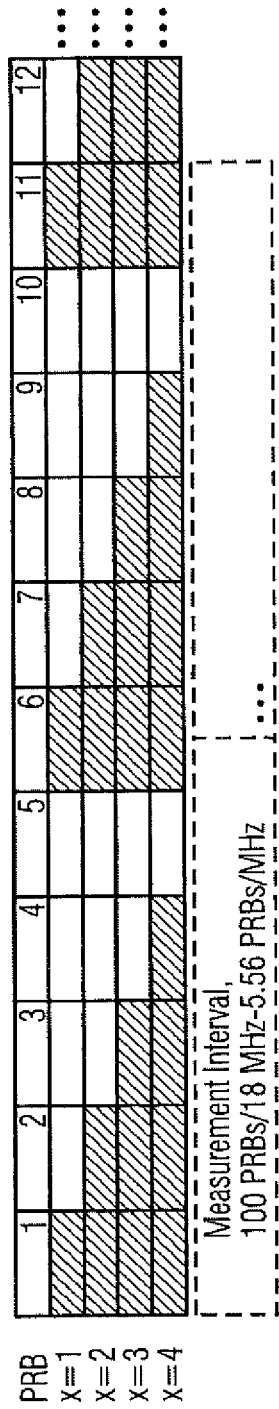
FIG. 5 illustrates B-IFDMA interlace A+B with respect to a measurement interval, according to certain embodiments.
FIG. 6 illustrates $P_{loss,AB}$ and $P_{max,AB}$ as a function of cluster size, x, according to certain embodiments.

FIG. 5 illustrates B-IFDMA interlace A+B with respect to a measurement interval, according to certain embodiments. In this example, the measurement interval is 1 MHz.

Certain embodiments may specially handle the usage of B-IFDMA interlace A+B. The usage can include UL power control setting, which can be referred to as solution #1 and/or cluster-specific power control and dropping, which can be referred to as solution #2. Thus, these two solutions can be used either alone or in combination.

The first solution can be based on a specific way for determining the maximum transmission power value when applying B-IFDMA interlace A+B. The final maximum transmission power may further be limited by regulatory or specification limitation on the maximum transmission power. The maximum transmission power value when applying B-IFDMA interlace A+B can be denoted as $P_{max,AB}$.

The value, $P_{max,AB}$, can be defined in such a way that maximum PSD does not exceed the given limit in any of the measurement intervals, such as a 1 MHz bandwidth portion. The value, $P_{max,AB}$, can be defined by means of the following terms: max PSD/measurement interval, (dBm/MHz), which can be given by the regulator; channel bandwidth, ChBW (MHz), which may be, for example, either 20 MHz or 10 MHz and can include 100 or 50 PRBs in, for example, LTE; and required power loss or power reduction, denoted as $P_{loss,AB}$.

In order to meet the PSD requirement, $P_{loss,AB}$ can be determined according to following equation, assuming ChBW-20 MHz, and measurement interval equal to 1 MHz: $P_{loss,AB}=10*\log 10((100/18-5+X))-10*\log 10(\text{number\_of\_clusters/number\_of\_measurement\_intervals})$, where measurement bandwidth in PRBs equals to 1 MHz (i.e. 100 PRBs/18 MHz) and the occupied signal bandwidth corresponds to at least one cluster but less than two clusters within each measurement interval (1 MHz) corresponding to the used channel bandwidth (=0.9*nominal bandwidth). The cluster size can equal X and the constant 5 can correspond to the cluster spacing/offset between interlaces.

With the given assumptions, $P_{loss,AB}$ can be generalized to any measurement bandwidth of z PRBs: $P_{loss,AB}=10*\log 10((z-5+X))-10*\log 10(\text{number\_of\_clusters/number\_of\_measurement\_intervals})$.

$P_{max,AB}$ can be then obtained as the following:

$$P_{max,AB} \text{ (dBm)} = PSD_{max}\left(\frac{dBm}{MHz}\right) + 10*\log10(0.9*ChBW) - P_{loss,AB}.$$

When applying B-IFDMA interlace A+B with cluster size x=1, and with $PSD_{max}$=11 dBm/MHz, $P_{max,AB}$ can be obtained as shown in Table 3:

TABLE 3

| A | $PSD_{max}$ | 11 | dBm/MHz |
|---|---|---|---|
| B | $P_{psd\_max} = PSD_{max} + 10*\log10(0.9*ChBW)$ | 23.55 | dBm |
| C | $P_{loss,AB}$ | 1.46 | dB |
| D | $P_{max,AB}$ | 22.09 | dBm | b = a + 10*log10(18)
c = 10*log10(100/18 − 5 + 1) − 10*log10(20/18)
d = b − c

The calculation in Table 3 shows that maximum power loss with B-IFDMA interlace A+B is 1.09 dB (2.55−1.46) smaller compared to B-IFDMA interlace A or B. Also, $P_{loss,AB}$ reduces further, when increasing the cluster size x, as will be seen below. Furthermore, when compared to the case with 6 interlaces, and correspondingly 16 or 17 clusters, the number of available resource elements is also higher, allowing for higher coding gain.

The second solution can be based on cluster-specific power control and/or dropping for B-IFDMA interlace A+B. This approach can include the following steps: determine the initial Tx power value, denoted as $P_{unlimited}$, for UL transmission based on e.g. the current PC rules; and determine $P_{ltd}$, by upper-limiting $P_{unlimited}$ by $P_{psd\_max}$, which can correspond to maximum Tx power value with the PSD limit, where $P_{ltd}=\min(P_{unlimited}, P_{psd\_max})$ and $P_{psd\_max}=PSD_{max}+10*\log 10(0.9*ChBW)$.

The second approach also include the following steps: determine Max Tx power for current B-IFDMA interlace A+B according to the first solution, discussed above, where max Tx power for current B-IFDMA interlace A+B can be denoted as $P_{max,AB}$; and if $P_{max,AB}<P_{psd\_max}$ then determine which of the measurement intervals contain more than one 1 cluster.

In the second approach, special handling can be applied for predefined clusters or PRBs corresponding to each determined measurement interval. After special handling, each measurement interval can fulfil the PSD limit. Special handling can include PRB dropping, PRB-specific power reduction and subcarrier dropping, as discussed below.

The first and second solutions can be various implemented. The following are some non-limiting examples.

Referring again to the first solution, FIG. 6 shows $P_{loss,AB}$ and $P_{max,AB}$ for B-IFDMA interlace A+B assuming that measurement interval equals 1 MHz, corresponds to 11 dBm/MHz and x varies between 1 and 5. Thus, FIG. 6 illustrates $P_{loss,AB}$ and $P_{max,AB}$ as a function of cluster size, x, according to certain embodiments.

In certain embodiments, B-IFDMA interlace A+B is applied only for certain UEs/channels. For example, B-IFDMA interlace A+B may be applied only to UEs located at the cell edge and/or UEs experiencing PSD-limitation.

A UE may receive information on the maximum PSD or on the maximum transmission power per frequency measurement interval, e.g. 11 dBm/MHz, that is allowed on the cell or network from the system information. The UE can adjust the transmission power according to the transmission power control that incorporates the received limits on the maximum PSD or on the maximum transmission power per measurement interval. The UE experiences PSD-limitation when the UE limits the transmission power due to the received maximum PSD limit.

Usage of B-IFDMA interlace A+B can be fully controlled by an access node, such as an eNB. For example, for PUCCH/PUSCH the eNB may select B-IFDMA interlace A+B based on UL measurement and/or feedback, included e.g. on power headroom reporting, from UE. By contrast, for RA preamble the selection may be done by the UE based on DL path loss measurement and predetermined rules obtained from the system information.

B-IFDMA interlace A+B may apply similar formats as regular B-IFDMA interlace, such as A or B considered individually. Thus, Interlace A+B may apply either sequence modulation or (DFT-S-)OFDMA.

As mentioned above, the second solution can involve PRB or subcarrier dropping. This dropping can reduce the number of resource elements available within B-IFDMA interlace A+B. This can be done in a deterministic manner provided that both UE and eNB follow the same dropping rules.

Figure 7:
FIG. 7, which extends over
Figure 7A:
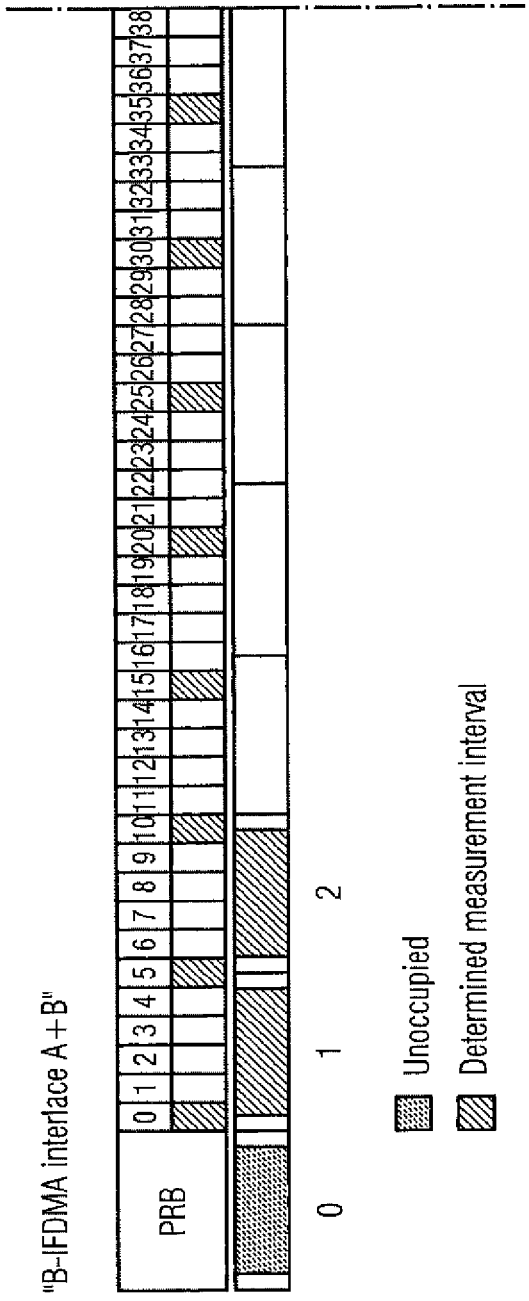

FIG. 7, which extends over FIGS. 7A, 7B, and 7C, illustrates an example of measurement of B-IFDMA interlace A+B, according to certain embodiments. In this example, (20 MHz, x=1) there are four measurement intervals (#1, #2, #10, #11) considered as determined measurement intervals having more than one cluster. Moreover, there are in total six clusters located within the determined measurement intervals.

Figure 8B:
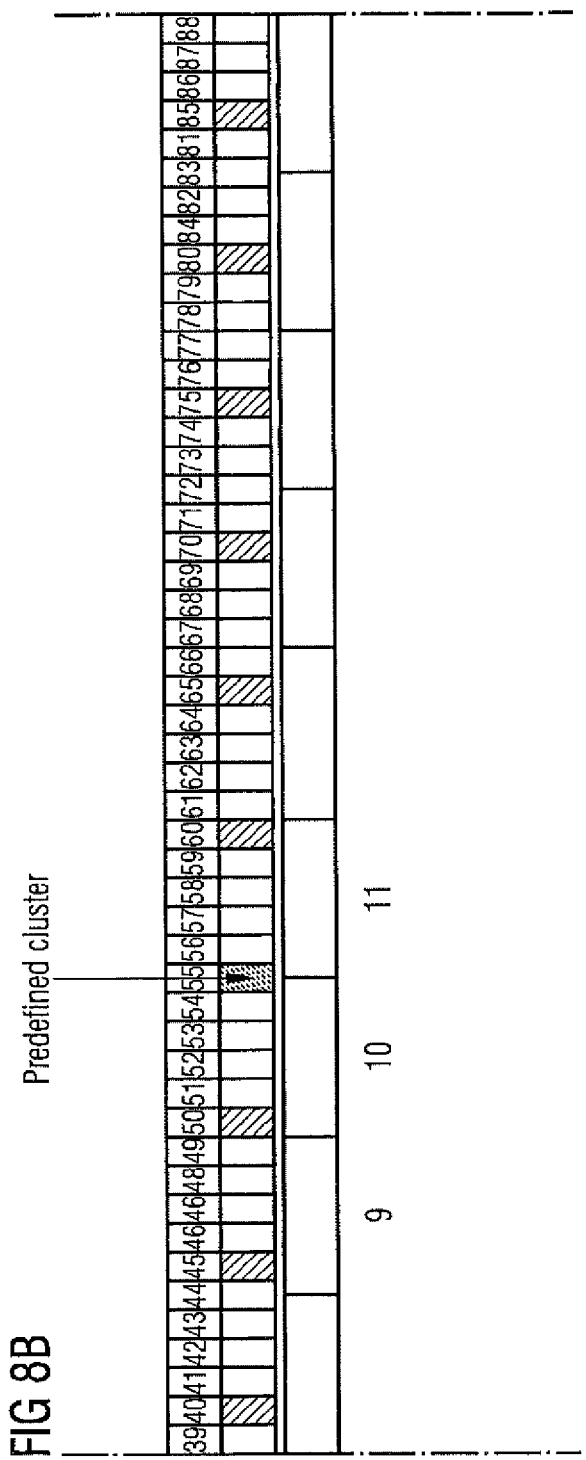

FIG. 8, which extends over FIGS. 8A, 8B, and 8C, illustrates predefined clusters, according to certain embodiments. As shown in FIG. 8, clusters located with PRBs 5 and 55 can be considered as predefined clusters. They can be, for example, dropped completely. This dropping can be considered special handling, as mentioned above. After dropping, all measurement intervals may contain at most one cluster.

Special handling can be applied to one or more clusters corresponding to determined measurement intervals. PRB dropping can correspond to an operation where a certain PRB is not transmitted at all. Subcarrier dropping can be similar to PRB dropping. Subcarriers that are not transmitted can be selected with the granularity of one subcarrier/resource element, instead of PRB.

PRB/cluster-specific power control can correspond to a power control where Tx power or power spectral density of a predefined PRB/cluster within a determined measurement interval can be reduced such that a PSD limit for each measurement interval is fulfilled.

There may be various ways to find or otherwise determine measurement intervals with more than one cluster. The following, therefore, is an example of how to find determined measurement intervals. This example relates to scenario with 20 MHz, 100 PRBs, measurement interval=1 MHz.

In this example, j=relative cluster index of B-IFDMA interlace A+B (0, 1, . . . , 19); m(j)=PRB index of cluster index. m(j)∈[0, 1, . . . , 99]; and n=measurement interval index (0, 1, . . . , 19).

The determination may begin by determining a measurement interval index for each cluster, n(j)=floor (m(j)/(100/18)). Then, it can be determine that special handling may be required for cluster j if n(j)=n(j+1), for any j. Otherwise, no special handling may be required.

Figure 9:
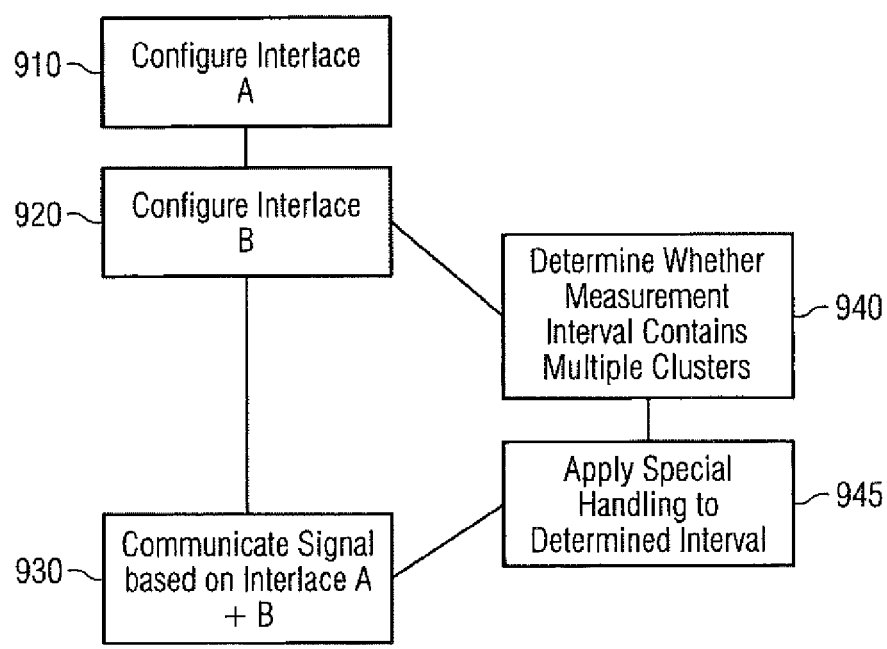
FIG. 9 illustrates a method according to certain embodiments.

FIG. 9 illustrates a method according to certain embodiments. As shown in FIG. 8, a method can include, at 910, configuring a first interlace having a first starting physical resource block. This first interlace may be Interlace A discussed above. The method can also include, at 920, configuring a second interlace having a second starting physical resource block offset from the first physical resource block. This second interlace may be Interlace B discussed above. The configuring can be done any desired way, such as a manufacturer configuration, a network update, a manual configuration, or software-based configuration. Other mechanisms are also permitted. The configuration can be done by an access node, such as an eNodeB. The eNodeB can indicate to the UE with PDCCH UL grant the interlaces A and B. Other mechanisms are also permitted.

The method can further include, at 930, communicating (for example, transmitting and/or receiving) a signal based on a combination of the first interlace and the second interlace. The combination can include at least one cluster but less than two clusters in each measurement interval. The combination may be B-IFDMA interlace A+B, as discussed above. For example, both the first interlace and the second interlace can be block interleaved frequency division multiple access interlaces, for example as illustrated in FIG. 4.

The communication at 930 can be variously implemented. For example, a UE can transmit the signal according to the configuration received from the eNB in 910 and 920, the eNodeB can receive the signal.

The transmitting or receiving the signal based on the combination of the first interlace and the second interlace can be contingent on at least one of a corresponding user equipment being located at a cell edge or the corresponding user equipment experiencing power spectral density limitation. Other user equipment specific bases for applying this combination to, for example, uplink communications are also permitted.

A cluster size of the first interlace can be the same as a cluster size of the second interlace. Other sizes are also permitted.

A power spectral density of the signal can be controlled to avoid exceeding a predetermined limit in any measurement interval. This may done by, for example, the first solution described above. Control of the power spectral density can be configured to take into account maximum power spectral density per measurement interval. The control of the power spectral density can also or alternatively be configured to take into account channel bandwidth. The control of the power spectral density can also or alternatively be configured to take into account required power reduction. The control of the power spectral density may be incorporated into a transmission power control procedure.

In certain embodiments, the signal can be controlled cluster-specifically. This may, for example, follow the second solution. Accordingly, the signal can be controlled based on cluster-specific power control and/or based on cluster-specific dropping.

The cluster-specific control can take into account an initial unlimited transmission power level. The cluster-specific control can also take into account a maximum transmission power level within a power spectral density limit. The method can further include, at 940, determining whether a measurement interval contains more than one cluster and, at 945, applying special handling for predefined clusters corresponding to the determined measurement interval.

The special handling can be configured to ensure that a power spectral density limit is fulfilled for the determined measurement interval. The special handling can include at least one of physical resource block dropping, physical resource block specific power reduction, or subcarrier dropping.

FIG. 10 illustrates a system according to certain embodiments of the invention. It should be understood that each block of the flowchart of FIG. 9 may be implemented by various means or their combinations, such as hardware, software, firmware, one or more processors and/or circuitry. In one embodiment, a system may include several devices, such as, for example, network element 1010 and user equipment (UE) or user device 1020. The system may include more than one UE 1020 and more than one network element 1010, although only one of each is shown for the purposes of illustration. A network element can be an access point, a base station, an eNode B (eNB), or any other network element. Each of these devices may include at least one processor or control unit or module, respectively indicated as 1014 and 1024. At least one memory may be provided in each device, and indicated as 1015 and 1025, respectively. The memory may include computer program instructions or computer code contained therein, for example for carrying out the embodiments described above. One or more transceiver 1016 and 1026 may be provided, and each device may also include an antenna, respectively illustrated as 1017 and 1027. Although only one antenna each is shown, many antennas and multiple antenna elements may be provided to each of the devices. Other configurations of these devices, for example, may be provided. For example, network element 1010 and UE 1020 may be additionally configured for wired communication, in addition to wireless communication, and in such a case antennas 1017 and 1027 may illustrate any form of communication hardware, without being limited to merely an antenna.

Transceivers 1016 and 1026 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 1020 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 1020 may be a sensor or smart meter, or other device that may usually be configured for a single location.

In an exemplifying embodiment, an apparatus, such as a node or user device, may include means for carrying out embodiments described above in relation to FIGS. 4 through 9.

Processors 1014 and 1024 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 1015 and 1025 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 1010 and/or UE 1020, to perform any of the processes described above (see, for example, FIG. 9). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 10 illustrates a system including a network element 1010 and a UE 1020, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, uplink coverage can be improved without compromising the good multiplexing properties in certain embodiments. Moreover, certain embodiments can be fully compatible with 10 interlaces and 10 clusters, 20 MHz. Certain embodiments may also fulfil ETSI bandwidth occupancy rule with maximum multiplexing capacity.

Additionally, in certain embodiments a combined interlace, such as B-IFDMA Interlace A+B, may be applied only by coverage limited UEs while the vast majority of UEs may apply 10 interlaces with better multiplexing properties.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

3GPP Third Generation Partnership Project
ACK Acknowledgement
ARI ACK/NACK resource Indicator
B-IFDMA Block Interleaved Frequency Division Multiple Access
BW BandWidth
CA Carrier Aggregation
CCE Control Channel Element
CDM Code Division Multiplexing
CRC Cyclic Redundancy Check
CSI Channel State Information
DCI Downlink Control Information
DL Downlink
eNB Evolved NodeB
ETSI European Telecommunications Standards Institute
FDD Frequency Division Duplex
FDM Frequency Division Multiplex
HARQ Hybrid Automatic Repeat Request
IFDMA Interleaved Frequency Division Multiple Access
LAA Licensed Assisted Access
LBT Listen-Before-Talk
LTE Long Term Evolution
NACK Negative Acknowledgement
OFDMA Orthogonal Frequency Division Multiplexing
SC-FDMA Single-Carrier Frequency Division Multiplexing
PCell Primary cell
P-CSI Periodic Channel State Information
PDSCH Physical Downlink Shared Control Channel
PRACH Physical Random Access Channel
PRB Physical Resource Block
PUCCH Physical Uplink Control Channel
PUSCH Physical Uplink Shared Channel
RRC Radio Resource Control
TDD Time Division Duplex
TDM Time Division Multiplex
Tx Transmission
TXOP Transmission Opportunity
UCI Uplink Control Information
UE User Equipment
UL Uplink
DFT Discrete Fourier Transform
PC Power Control According to a first embodiment, a method can include configuring a first interlace having a first starting physical resource block. The method can also include configuring a second interlace having a second starting physical resource block offset from the first physical resource block. The method can further include transmitting or receiving a signal based on a combination of the first interlace and the second interlace. The combination can include at least one cluster but less than two clusters in each measurement interval.

In a variant, the configuring the first interlace and the second interlace can include an access node sending a configuration in an uplink grant to a user equipment and the receiving the signal can comprise receiving the signal at the access node from the user equipment.

In a variant, the configuring the first interlace and the second interlace can include a user equipment receiving from an access node a configuration in an uplink grant and the transmitting the signal can comprise transmitting the signal to the access node from the user equipment.

In a variant, the first interlace and the second interlace are both block interleaved frequency division multiple access interlaces.

In a variant, the signal comprises an uplink signal.

In a variant, a cluster size of the first interlace is the same as a cluster size of the second interlace.

In a variant, a power spectral density of the signal is controlled to avoid exceeding a predetermined limit in any measurement interval.

In a variant, control of the power spectral density is configured to take into account maximum power spectral density per measurement interval.

In a variant, control of the power spectral density is configured to take into account channel bandwidth.

In a variant, control of the power spectral density is configured to take into account required power reduction.

In a variant, the signal is controlled cluster-specifically.

In a variant, the signal is controlled based on cluster-specific power control.

In a variant, the signal is controlled based on cluster-specific dropping.

In a variant, the cluster-specific control can take into account an initial unlimited transmission power level.

In a variant, the cluster-specific control can take into account a maximum transmission power level within a power spectral density limit.

In a variant, the method can include determining whether a measurement interval contains more than one cluster and applying special handling for predefined clusters corresponding to the determined measurement interval.

In a variant, the special handling is configured to ensure that a power spectral density limit is fulfilled for the determined measurement interval.

In a variant, the special handling comprises at least one of physical resource block dropping, physical resource block specific power reduction, or subcarrier dropping.

According to a second embodiment, an apparatus can include means for performing the method according to the first embodiment, in any of its variants.

According to a third embodiment, an apparatus can include at least one processor and at least one memory and computer program code. The at least one memory and the computer program code can be configured to, with the at least one processor, cause the apparatus at least to perform the method according to the first embodiment, in any of its variants.

According to a fourth embodiment, a computer program product may encode instructions for performing a process including the method according to the first embodiment, in any of its variants.

According to a fifth embodiment, a non-transitory computer readable medium may encode instructions that, when executed in hardware, perform a process including the method according to the first embodiment, in any of its variants.

According to a sixth embodiment, a system may include two apparatuses, each according to the second or third embodiment, configured to communicate with one another using the signal.

What is claimed is:

1. A method, comprising:

configuring a first interlace having multiple clusters of equally spaced physical resource blocks;

configuring a second interlace having multiple clusters of equally spaced physical resource blocks, wherein the first interlace and second interlace have a cluster spacing in terms of physical resource blocks between clusters of the first and second interlaces in a plurality of physical resource blocks forming a channel bandwidth;

transmitting a signal based on both of the first interlace and the second interlace, wherein both the first and second interlaces together have at least one cluster but less than two clusters in each measurement interval over which power of the signal is to be measured;

controlling a power spectral density of the signal to avoid exceeding a predetermined limit in any measurement interval;

determining a measurement interval contains more than one cluster; and applying special handling associated with the transmitting for predefined clusters corresponding to the determined measurement interval.

2. The method of claim 1, wherein the configuring the first interlace and the configuring the second interlace comprises an access node sending a configuration in an uplink grant to a user equipment.

3. The method of claim 1, wherein the first interlace and the second interlace are both block interleaved frequency division multiple access interlaces.

4. The method of claim 1, wherein the signal comprises an uplink signal.

5. The method of claim 1, wherein a cluster size of the clusters of the first interlace is a same size as a cluster size of the clusters of the second interlace.

6. The method of claim 1, wherein the controlling the power spectral density takes into account maximum power spectral density per measurement interval.

7. The method of claim 1, wherein the controlling the power spectral density takes into account the channel bandwidth.

8. The method of claim 1, wherein the controlling the power spectral density takes into account required power reduction.

9. The method of claim 1, wherein the method comprises controlling the signal on a cluster-specific basis.

10. The method of claim 9, wherein the controlling the signal on the cluster-specific basis takes into account an initial unlimited transmission power level.

11. The method of claim 9, wherein the controlling the signal on the cluster-specific basis takes into account a maximum transmission power level within a power spectral density limit.

12. The method of claim 1, wherein the method comprises controlling the signal based on cluster-specific power control.

13. The method of claim 1, wherein the method comprises controlling the signal based on cluster-specific dropping.

14. The method of claim 1, wherein the special handling is configured to ensure that a power spectral density limit is fulfilled for the determined measurement interval.

15. The method of claim 1, wherein the special handling comprises at least one of physical resource block dropping, physical resource block specific power reduction, or subcarrier dropping.

16. An apparatus, comprising:

at least one processor; and at least one memory storing instructions that, when executed by the at least one processor, cause the apparatus at least to:

configure a first interlace having multiple clusters of equally spaced physical resource blocks;

configure a second interlace having multiple clusters of equally spaced physical resource blocks, wherein the first interlace and second interlace have a cluster spacing in terms of physical resource blocks between clusters of the first and second interlaces in a plurality of physical resource blocks forming a channel bandwidth;

transmit a signal based on both of the first interlace and the second interlace, wherein both the first and second interlaces together have at least one cluster but less than two clusters in each measurement interval over which power of the signal is to be measured;

controlling a power spectral density of the signal to avoid exceeding a predetermined limit in any measurement interval;

determining a measurement interval contains more than one cluster; and applying special handling associated with the transmission of the signal for predefined clusters corresponding to the determined measurement interval.

17. A computer program product comprising a non-transitory computer-readable storage medium bearing computer program code embodied therein for use with a computer, the computer program code comprising code for causing the computer to perform operations comprising:

configuring a first interlace having multiple clusters of equally spaced physical resource blocks;

configuring a second interlace having multiple clusters of equally spaced physical resource blocks, wherein the first interlace and second interlace have a cluster spacing in terms of physical resource blocks between clusters of the first and second interlaces in a plurality of physical resource blocks forming a channel bandwidth;

transmitting a signal based on both of the first interlace and the second interlace, wherein both the first and second interlaces together have at least one cluster but less than two clusters in each measurement interval over which power of the signal is to be measured;

controlling a power spectral density of the signal to avoid exceeding a predetermined limit in any measurement interval;

determining a measurement interval contains more than one cluster; and applying special handling associated with the transmitting for predefined clusters corresponding to the determined measurement interval.

* * * * *